United States Patent [19]

Thomsen et al.

[11] Patent Number: 5,705,870
[45] Date of Patent: Jan. 6, 1998

[54] UNIVERSALLY MOUNTABLE AUTOMOTIVE ALTERNATOR

[76] Inventors: Bradley E. Thomsen, 59 Sequoia Dr., Coram, N.Y. 11727; Lawrence G. Trowbridge, 812 Fort Salonga Rd., Northport, N.Y. 11768

[21] Appl. No.: 545,026

[22] Filed: Oct. 19, 1995

[51] Int. Cl.$^6$ ........................................ H02K 5/00
[52] U.S. Cl. .................. 310/91; 310/68 D; 310/417; 310/363; 310/86; 310/89; 248/604; 248/674; 417/361; 417/362
[58] Field of Search ...................... 310/68 D, 91, 310/86, 89; 248/604, 674; 417/300, 361, 362, 363

[56] References Cited

U.S. PATENT DOCUMENTS

| | | | |
|---|---|---|---|
| 4,028,568 | 6/1977 | Tatsumi et al. | 310/42 |
| 4,033,531 | 7/1977 | Levine | 248/16 |
| 4,260,125 | 4/1981 | Levine | 248/675 |
| 4,288,712 | 9/1981 | Hagenlocher et al. | 310/91 |
| 4,426,593 | 1/1984 | Chernoff et al. | 310/91 |
| 4,835,428 | 5/1989 | Komurasaki et al. | 310/68 D |
| 4,849,665 | 7/1989 | Kitamura et al. | 310/68 D |
| 4,922,151 | 5/1990 | Lewis | 310/91 |
| 4,980,589 | 12/1990 | Ochi et al. | 310/68 D |

Primary Examiner—Clayton E. LaBalle
Assistant Examiner—Elvin G. Enad
Attorney, Agent, or Firm—Michael I. Kroll

[57] ABSTRACT

A universal automotive alternator which comprises an alternator body, a front plate and an assemblage for attaching the front plate to the alternator body. A back plate is also provided. A structure is for securing the back plate to the alternator body. A facility is for mounting the front plate to a bracket on an engine. In some instances, a component is utilized for mounting the back plate to a bracket on the engine.

1 Claim, 9 Drawing Sheets

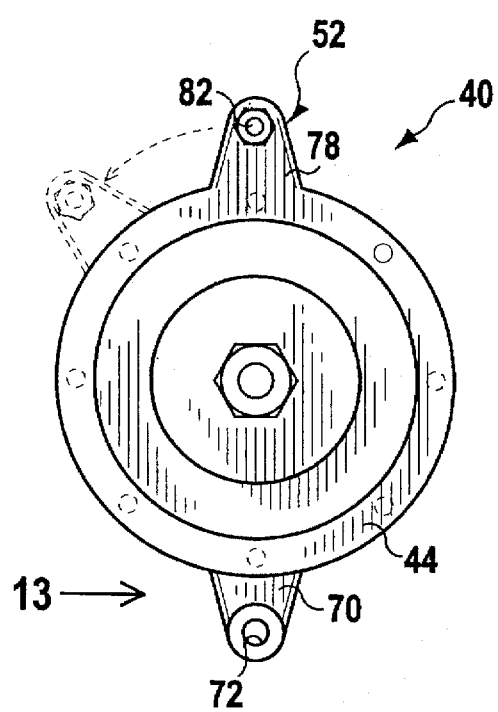
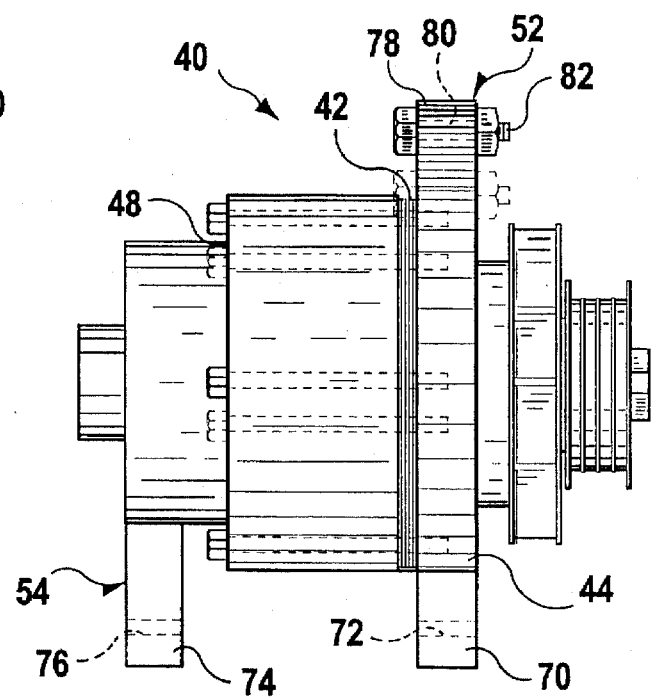
FIG 12  FIG 13
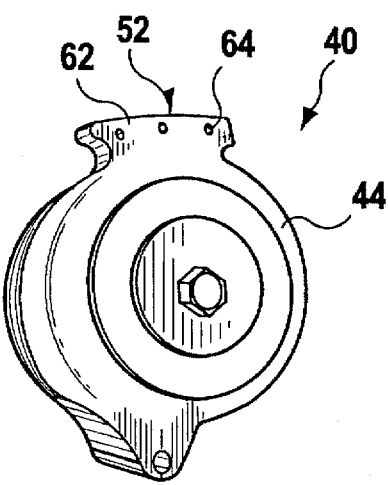
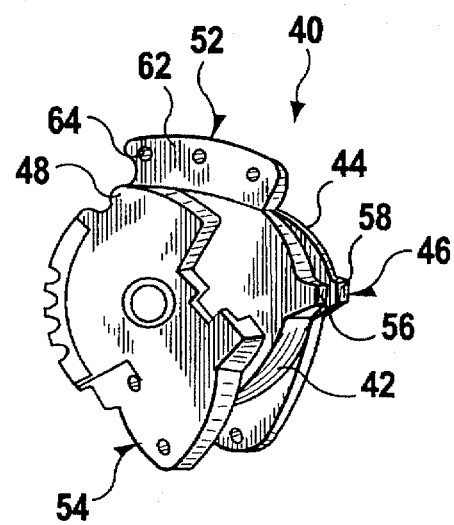
FIG 14  FIG 15

UNIVERSALLY MOUNTABLE AUTOMOTIVE ALTERNATOR

BACKGROUND OF THE INVENTION

The instant invention is the subject matter of Disclosure Document No.: 343,050, filed in the PTO on Nov. 16, 1993 and Disclosure Document No.: 356150, filed in the PTO on Jun. 16, 1994, and it is respectfully requested that these documents be retained beyond the two-year period, so that they may be relied upon as evidence of conception of the invention during the prosecution phase of this application, should the need arise.

1. Field of the Invention

The instant invention relates generally to electronic components and more specifically it relates to a universal automotive alternator.

2. Description of the Prior Art

Numerous electronic components have been provided in prior art. For example, U.S. Pat. No. 4,074,145 to Laffoon et al.; U.S. Pat. No. 4,439,750 to Fujiii et al.; U.S. Pat. No. 4,825,139 to Hamelin et al.; U.S. Pat. No. 5,274,876 to Wehrspann and U.S. Pat. No. 5,280,210 to Kress et al. all are illustrative of such prior art. While these units may be suitable for the particular purpose to which they address, they would not be as suitable for the purposes of the present invention as heretofore described.

LAFFOON, PERRY D.

BOETTCHER, ROBERT L.

ELECTRIC POWER GENERATING APPARATUS

U.S. Pat. No. 4,074,145

An electric power generator incorporating an automobile alternator operable in a high voltage mode suitable for providing power for hand power tools and in a low voltage mode suitable for maintaining the charge of a battery which provides a field current for the alternator. A switching circuit, manually or automatically actuable to place the generator in the high voltage mode of operation, interposes a voltage regulator in the field current circuit and connects the output of the alternator to the battery to charge the battery when the generator is operated in the low voltage mode and interposes a variable resistor in the field current circuit and disconnects the battery from the output of the alternator to permit adjustment of the output voltage of the alternator when the generator is operated in the high voltage mode.

FUJIII, KUNIHISA

TOMONO, NOBORU

SHIKANO, YUKIO

ARMATURE HOLDING STRUCTURE AND HINGE WIRE SPRING USED THEREIN

U.S. Pat. No. 4,439,750

An armature holding structure using a hinge wire spring in an electromagnetic relay, wherein one end of the hinge wire spring is held in a hole in the yoke of the electromagnet. The other end of the hinge wire spring is held in the hole in the armature, so that the pivot support structure of the armature at the end of the yoke is maintained by the hinge wire spring.

HAMELIN, GILBERT

PALMA, LUCIEN

ELECTRIC POWER SUPPLY UNIT IN PARTICULAR FOR A MOTOR VEHICLE, AND AN ELECTRIC ROTARY MACHINE FOR SUCH A UNIT

U.S. Pat. No. 4,825,139

The electric power supply comprises an electric rotary machine intended to be driven by an engine in order to supply electrical energy to a battery and/or to various user units, and rectifier means combined with the machine for obtaining direct current. The machine is chosen in such a way that when it is driven by the engine at its idling speed, the voltage at the terminals of the machine is insufficient to ensure charging of the battery. The unit comprises means to make it possible to establish periodically a voltage surge at the terminals of the machine and a current for charging the battery.

WEHRSPANN, JOHN H.

UNIVERSAL WINDSHIELD WIPER MECHANISM

U.S. Pat. No. 5,274,876

A portable, temporarily installable and removable windshield wiper unit provides for the clearance of windshields for motorcycles, recreational vehicles and the like not otherwise so equipped. The wiper unit contains a rotary motor driving an oscillating wiper arm through an eccentric pin on a drive wheel to provide the required oscillating action of the wiper arm. The unit may be powered by any appropriate electrical power source, such as the electrical system of the vehicle upon which it is installed or an independent battery. An additional feature provides a park position for the wiper arm, whereby the wiper arm will always stop at a predetermined position when the power switch is turned off. A case surrounding the various components of the unit serves to protect those components from the elements. If desired, a more permanent installation may be provided by securing the wiper unit to the inside of a vehicle fairing and driving the wiper through an opening in the fairing.

KRESS, WILLY

SELFERT, JOSEF

UNIVERSAL ELECTRIC MOTOR WITH A SWITCH RING MOUNTED ADJACENT THE BRUSHES

U.S. Pat. No. 5,280,210

An electric motor comprises bracket shaped end plates having extensions that lead directly to the stator and are connected to the stator by introducing the extensions into grooves. The motor includes a layered arrangement of components on the collector side, comprising a carrier plate with a punched grid pattern forming the electric wiring. The grid pattern, together with the carrier plate, carry brush holders. Next in the axial direction is a switching ring bridging preselected line connections of the grid pattern by means of short circuiting bridges, and which is rotatably seated in a central recess of a mounting plate provided on the end plate. All connections can be fabricated by simple pressing and plugging and the motor is suited for fully automatic assembly operations.

SUMMARY OF THE INVENTION

A primary object of the present invention is to provide a universal automotive alternator that will overcome the shortcomings of the prior art devices.

Another object is to provide a universal automotive alternator with interchangable front and rear mounting plates that will enable the alternator to be installed into a variety of automotive engine environments.

An additional object is to provide a universal automotive alternator in which the front and rear mounting plates can be quickly adjusted by installation into various automobile and truck makes and models.

A further object is to provide a universal automotive alternator that is simple and easy to use.

A still further object is to provide a universal automotive alternator that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 12 is a front view of a forth embodiment of the instant invention.

FIG. 13 is a side view of the forth embodiment taken in the direction of arrow 13 in FIG. 12.

FIG. 14 is a front perspective view identical to FIG. 10.

FIG. 15 is a rear perspective view identical to FIG. 11.

Similar reference characters denote corresponding features consistently throughout the attached drawings.

DETAILED DESCRIPTION OF THE PREFERRED EMBODIMENTS

Figure 1:
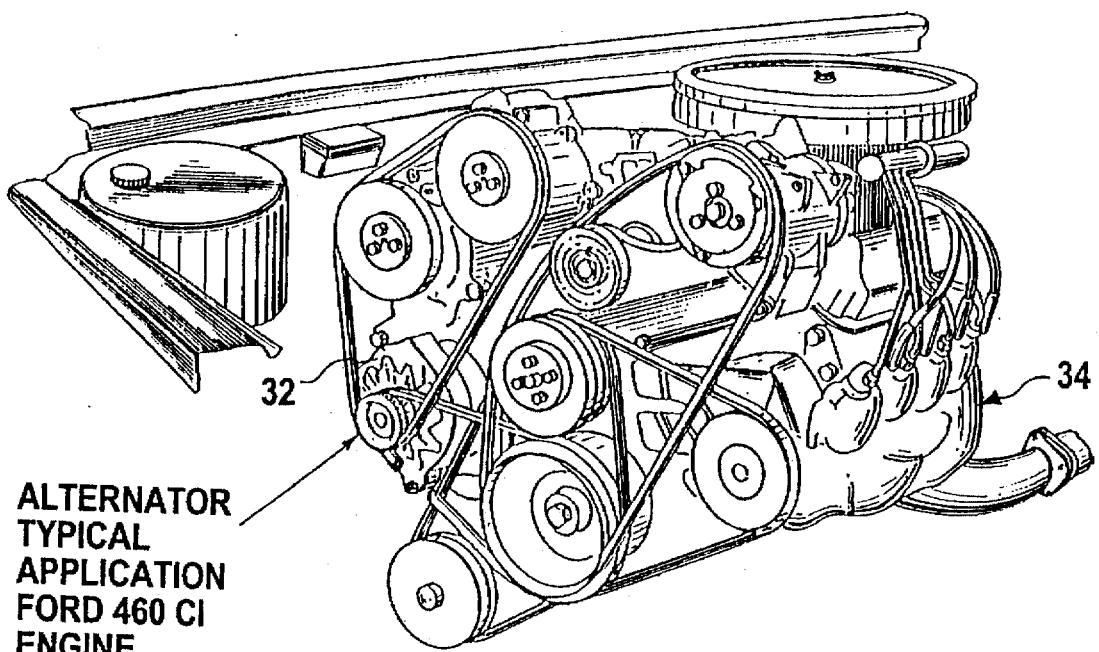
FIG. 1 is a front perspective view of the prior art, showing an alternator installed in a Ford 460 CI engine.
Figure 2:
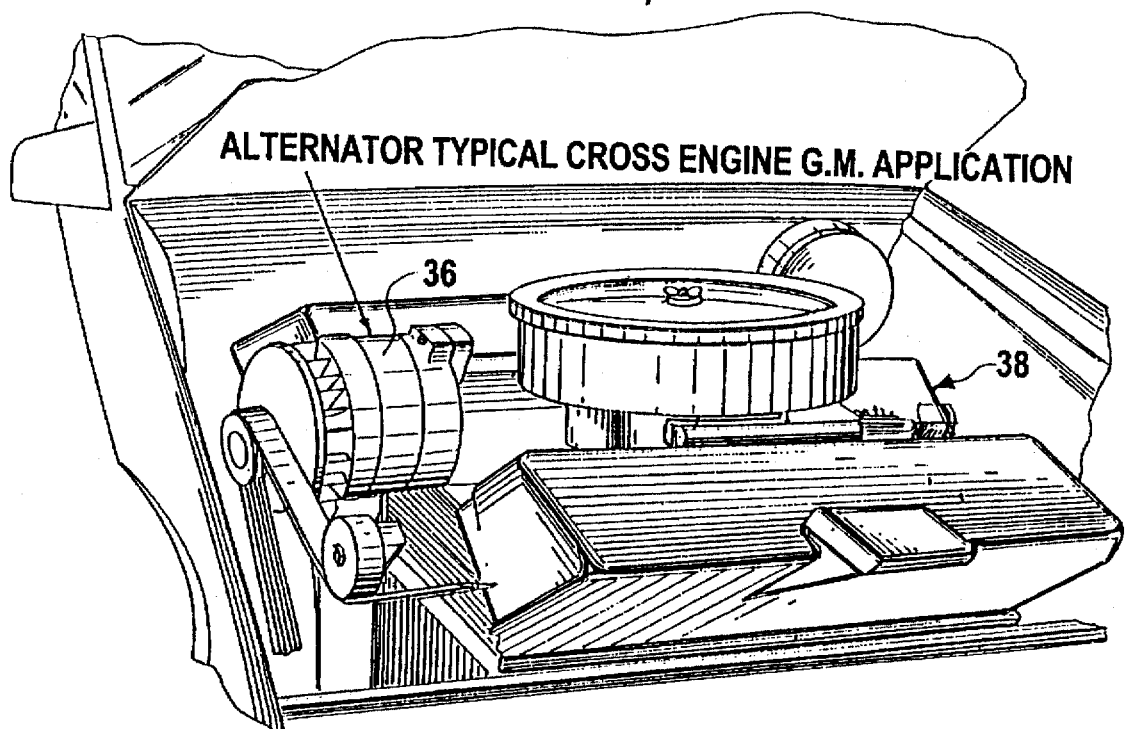
FIG. 2 is a front perspective view of the prior art, showing an alternator installed in a General Motors cross engine.

Turning now descriptively to the drawings, in which similar reference characters denote similar elements throughout the several views, FIGS. 1 and 2 show the prior art. In FIG. 1, a typical alternator 32 is installed in a Ford 460 CI engine 34. In FIG. 2, a typical alternator 36 is installed in A General Motors cross engine 38.

The instant invention being a universal automotive alternator 40 is shown in FIGS. 3 through 31 and basically consists of an alternator body 42, a front plate 44 and an assemblage 46, for attaching the front plate 44 to the alternator body 42. A back plate 48 is also provided. A structure 50 is for securing the back plate 48 to the alternator body 42. A facility 52 is for mounting the front plate 44 to a bracket on an engine (not shown). As shown in FIGS. 3, 4, 7, 11, 13, 15, 17, 19, 25, 27, 29 and 31, a component 54 is sometime utilized for mounting the back plate 48 to a bracket on the engine (not shown).

Figure 3:
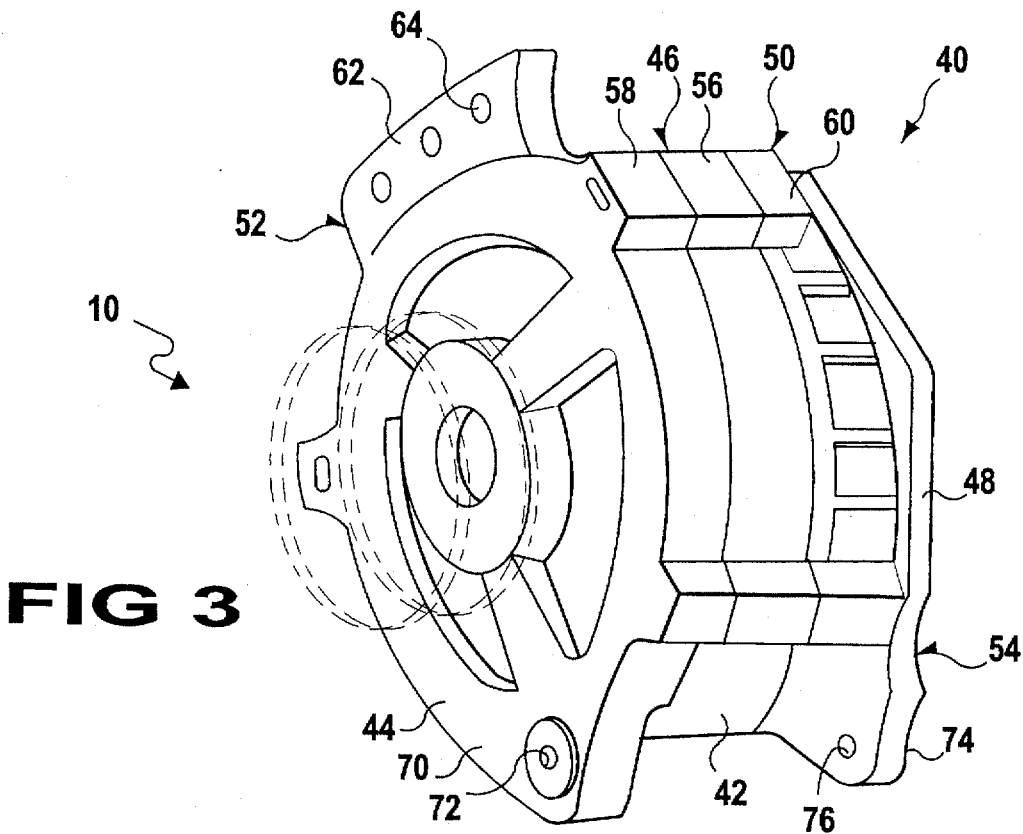
FIG. 3 is a front perspective view of a first embodiment of the instant invention.
Figure 4:
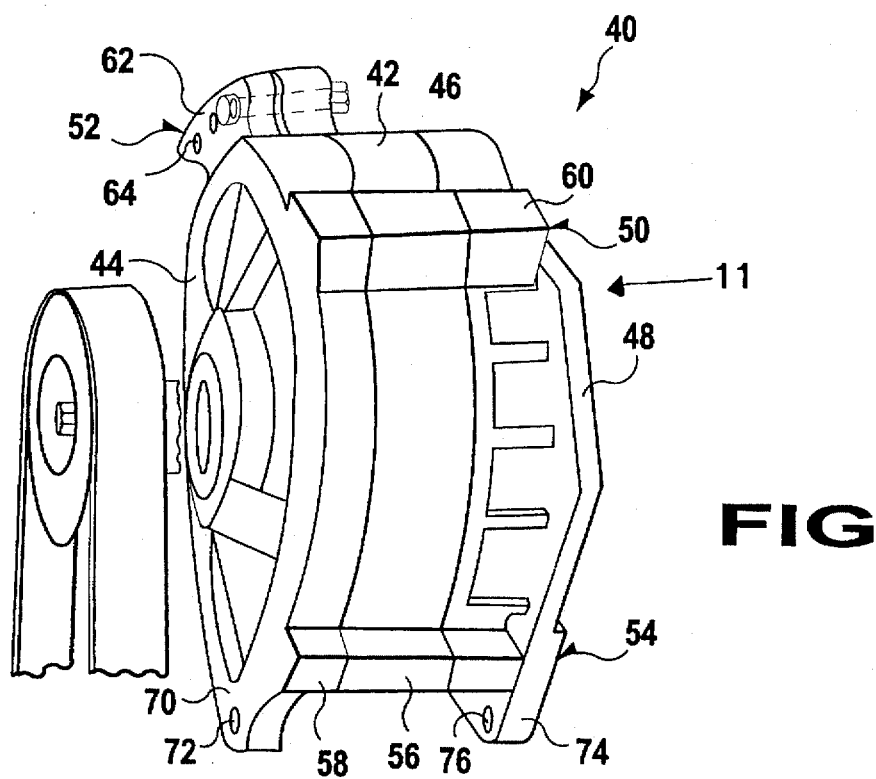
FIG. 4 is a front perspective view of the first embodiment, showing a portion of the belt and pulley connected to the rotor shaft which is broken away.
Figure 5:
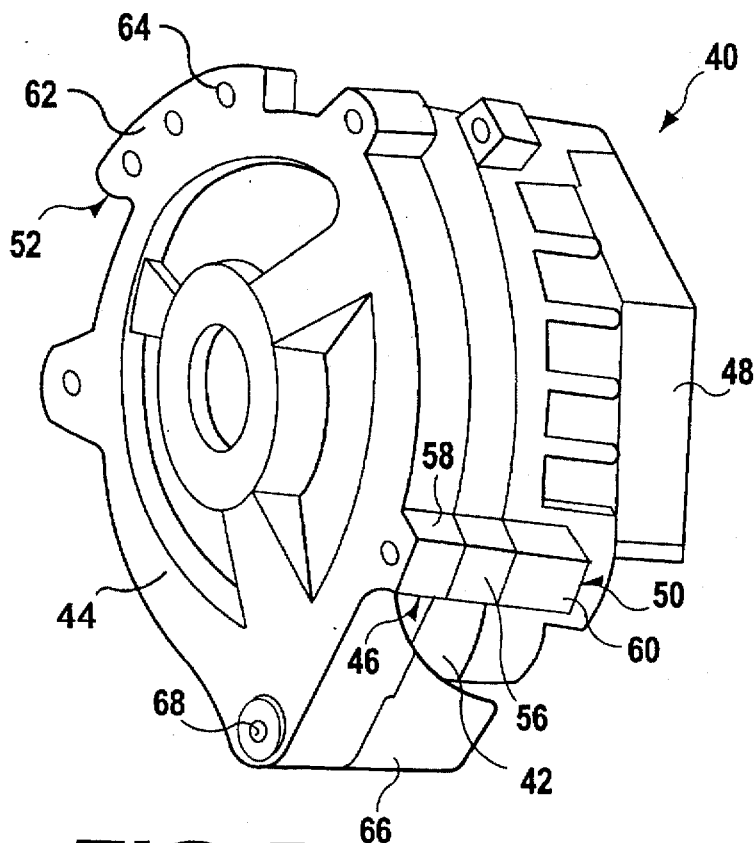
FIG. 5 is a front perspective view of a second embodiment of the instant invention.
Figure 6:
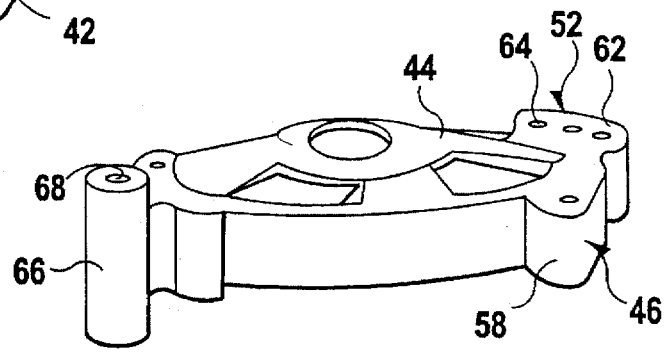
FIG. 6 is a side perspective view of the second front plate.
Figure 7:
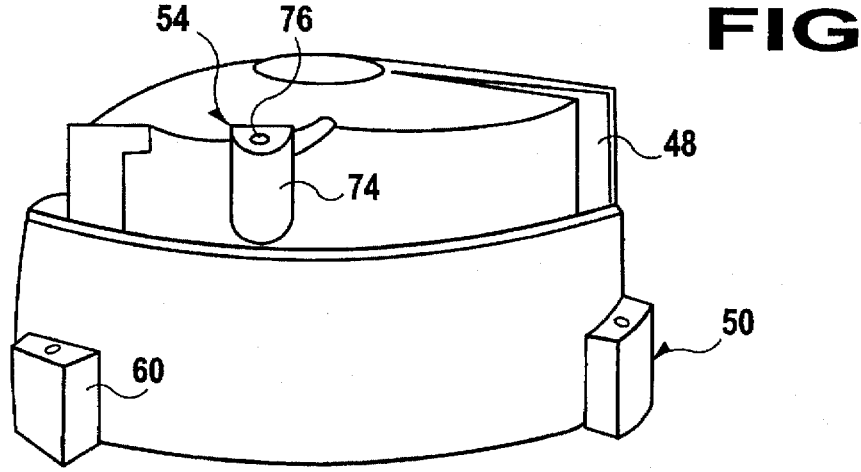
FIG. 7 is a side perspective view of the first back plate.
Figure 9:
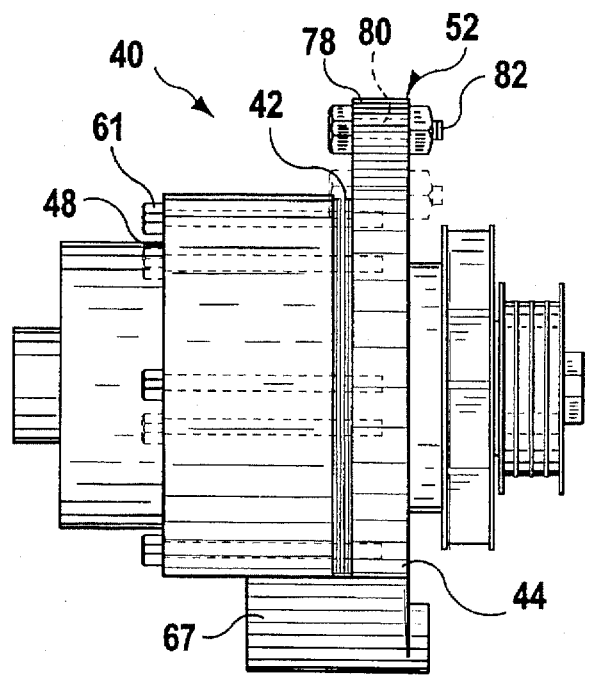
FIG. 9 is a side view of the third embodiment taken in the direction of arrow 9 in FIG. 8.
Figure 10:
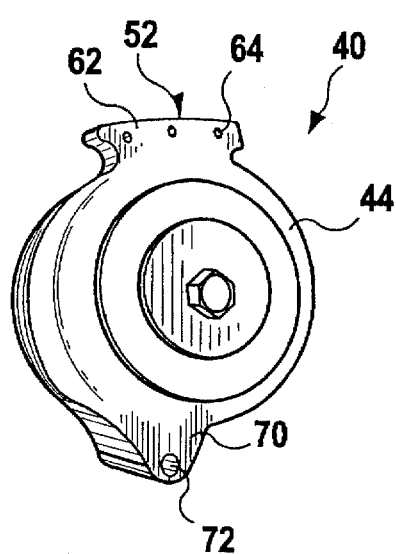
FIG. 10 is a front perspective view of the first embodiment taken in the direction of arrow 10 in FIG. 3.
Figure 11:
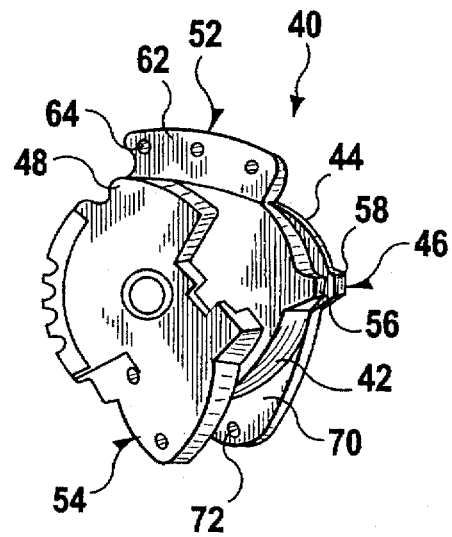
FIG. 11 is a rear perspective view of the first embodiment taken in the direction of arrow 11 in FIG. 4.

The front plate attaching assemblage 46, as best seen in FIGS. 3, 4 and 5, includes a plurality of through lugs 56 on the alternator body 42. A plurality of through lugs 58 are on the front plate 44, which are aligned with the alternator body through lugs 56. A plurality of through bolts 61, as best seen in FIG. 9, can engage with and retain the alternator body through lugs 56 with the front plate through lugs. The back plate securing structure 50 consists of a plurality of through lugs 60 on the back plate 48, which are aligned with the alternator body through lugs 56. The plurality of through bolts can also engage with and retain the alternator body through lugs 56 with the back plate through lugs 60.

The front plate mounting facility 52, as shown in FIGS. 5 and 60 includes a top ear 62 having three holes 64. A bottom long ear 66 has one hole 68. One of the holes 64 in the top ear 62 and the hole 68 in the bottom long ear 66 can receive mounting fasteners from the bracket (not shown).

The front plate mounting facility 52 in FIGS. 3 and 4 include a top ear 62 having three holes 64. A bottom ear 70 has one hole 72. One of the holes 64 in the top ear 62 and the hole 72 in the bottom ear 70 can receive mounting fasteners from the bracket (not shown). The back plate mounting component 54 is a bottom ear 74 having one hole 76. The one hole 76 in the bottom ear 74 can receive a mounting fastener from the engine bracket (not shown).

Figure 8:
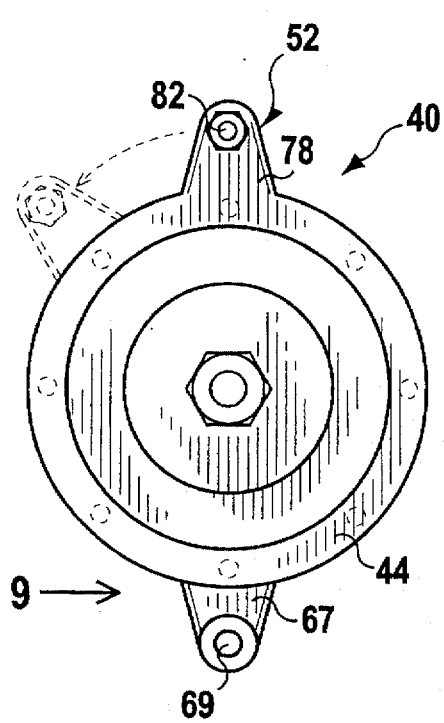
FIG. 8 is a front view of a third embodiment of the instant invention.

The front plate mounting facility 52 in FIGS. 8 and 9, includes an adjustable top ear 78 having one hole 80, which is adjustable when the plurality of through lugs on the front plate 44 are realigned with the plurality of through lugs on the alternator body 42. The one hole 80 in the adjustable top ear 78 and the one hole 69 in the bottom long ear mounting facility 67 on the back plate 48 can receive mounting fasteners 82 from the engine brackets (not shown).

The front plate mounting facility 52 in FIGS. 12 and 13, includes an adjustable top ear 78 having one hole 80. A bottom ear 70 has one hole 72. The one hole 80 in the adjustable top ear 78 and the one hole 72 in the bottom ear 70 can receive mounting fasteners 82 from the bracket. The back plate mounting component 54 in FIG. 13 is a bottom ear 74 having one hole 76. The one hole 76 in the bottom ear 74 can receive a mounting fastener from the bracket.

Figure 16:
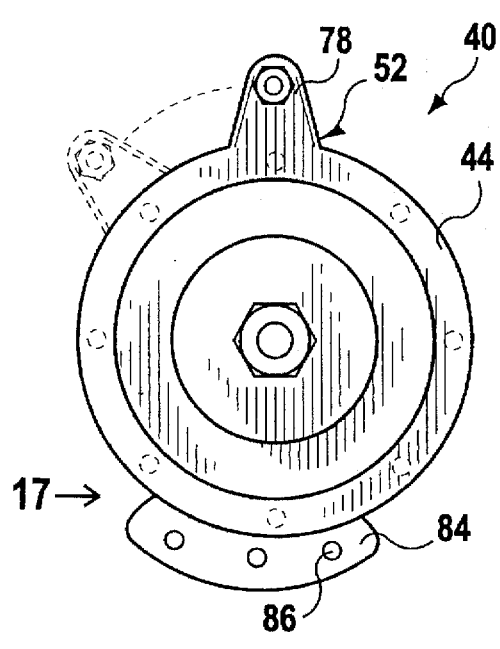
FIG. 16 is a front view of a fifth embodiment of the instant invention.
Figure 17:
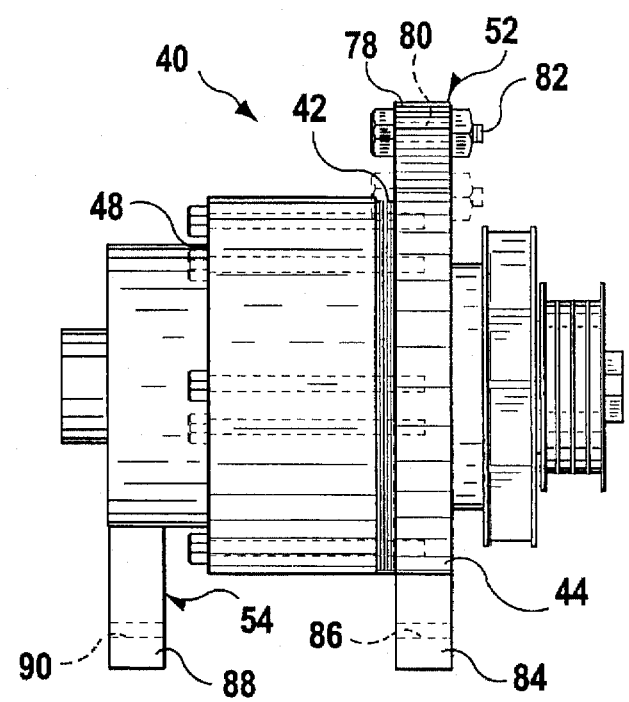
FIG. 17 is a side view of the fifth embodiment taken in the direction of arrow 17 in FIG. 16.
Figure 18:
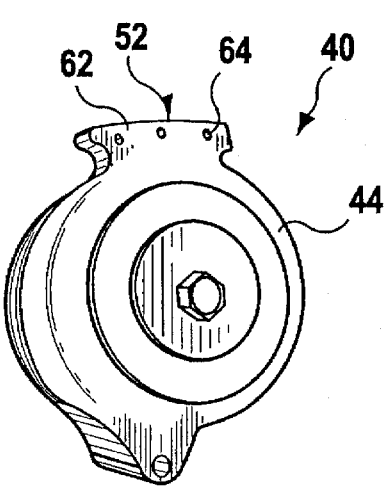
FIG. 18 is a front perspective view identical to FIG. 14.
Figure 19:
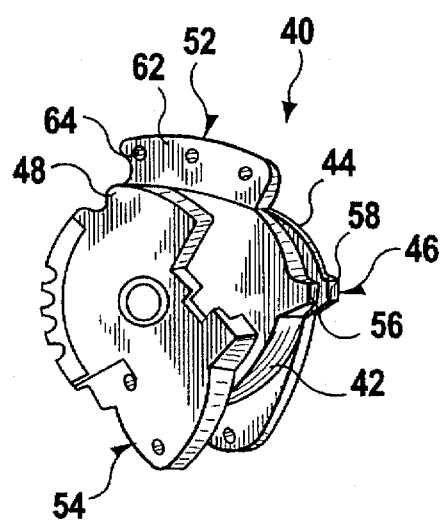
FIG. 19 is a rear perspective view identical to FIG. 15.

The front plate mounting facility 52 in FIGS. 16 and 17, consists of an adjustable top ear 78 having one hole 80. A bottom ear 84 has three holes 86. The one hole in the adjustable top ear 78 and one of the holes 86 in the bottom ear 84 can receive mounting fasteners 82 from the bracket.

The back plate mounting component 54 in FIG. 17, is a bottom ear 88 having three holes 90. One of the holes 90 in the bottom ear 88 can receive a mounting fastener from the bracket.

Figure 20:
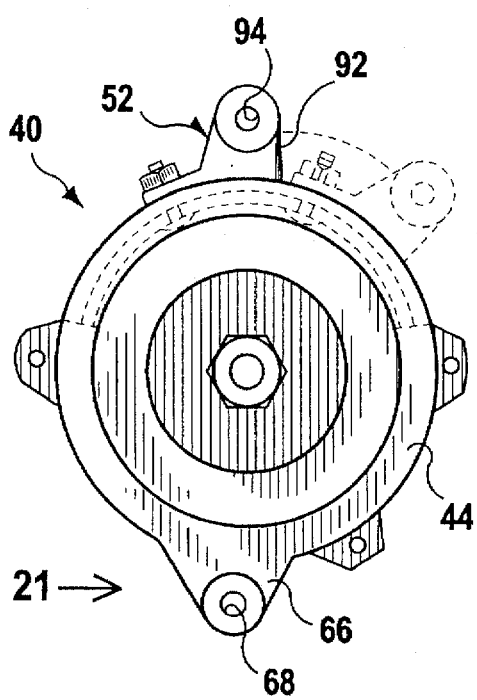
FIG. 20 is a front view of a sixth embodiment of the instant invention.
Figure 21:
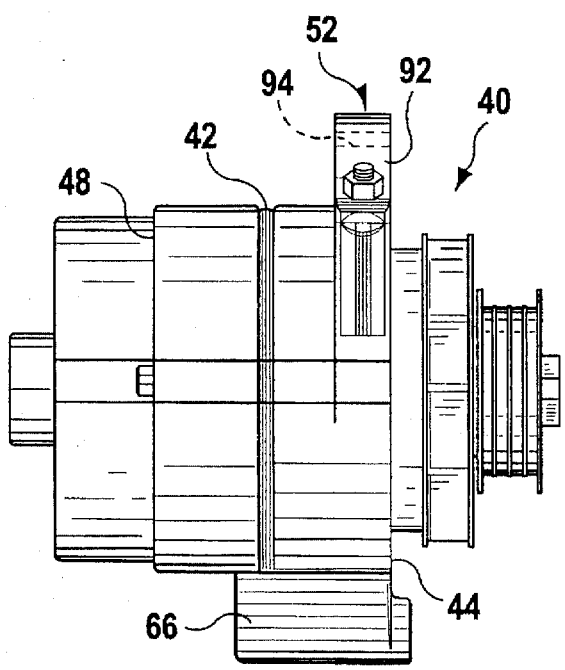
FIG. 21 is a side view of the sixth embodiment taken in the direction of arrow 21 in FIG. 20.

The front plate mounting facility 52 in FIGS. 20 and 21 includes a movable top ear 92 having one hole 94. A bottom long ear 66 has one hole 68. The one hole 94 in the moveable top ear 92 and the one hole 68 in the bottom long ear 66 can receive mounting fasteners from the bracket.

Figure 22:
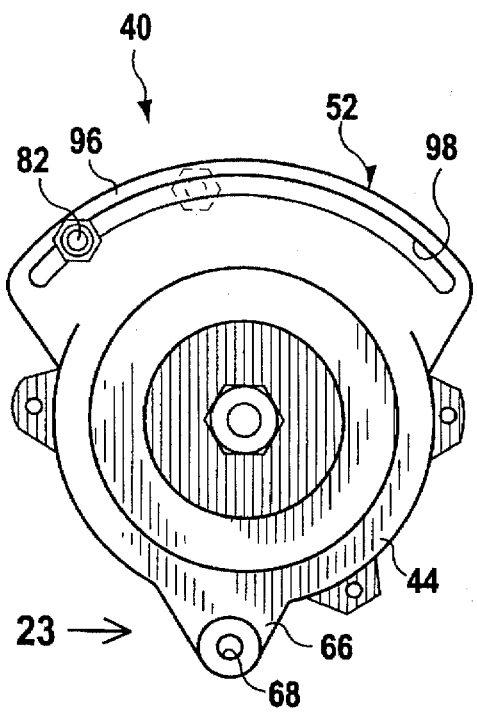
FIG. 22 is a front view of a seventh embodiment of the instant invention.
Figure 23:
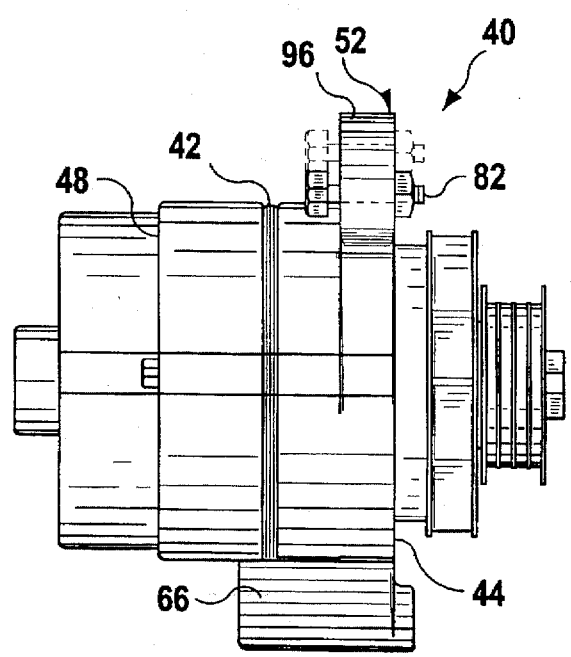
FIG. 23 is a side view of the seventh embodiment taken in the direction of arrow 23 in FIG. 22.

The front plate mounting facility 52 in FIGS. 22 and 23, consists of a wide top ear 96 having an elongated curved slot 98. A bottom long ear 66 has one hole 68. The elongated curved slot 98 in the wide top ear 96 and the one hole 68 in the bottom long ear 66 can receive mounting fasteners 82 from the bracket.

Figure 24:
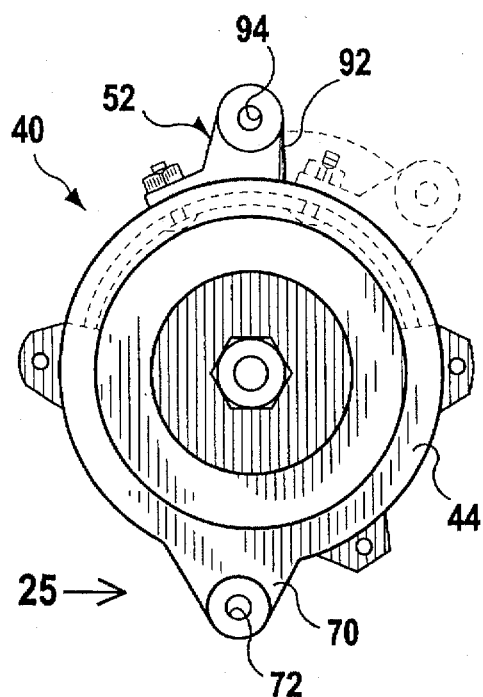
FIG. 24 is a front view of an eighth embodiment of the instant invention.
Figure 25:
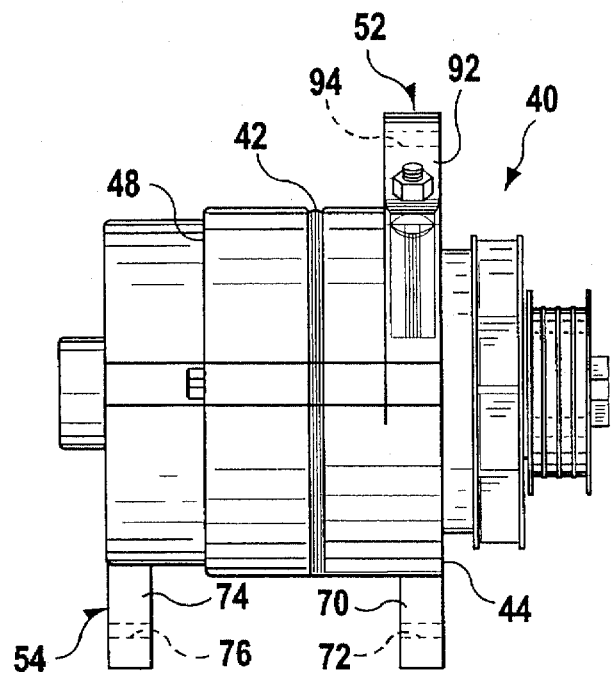
FIG. 25 is a side view of the eighth embodiment taken in the direction of arrow 25 in FIG. 24.

The front plate mounting facility in FIGS. 24 and 25, includes a movable top ear 92 having one hole 94. A bottom ear 70 has one hole 72. The one hole 94 in the movable top ear 92 and the one hole 72 in the bottom ear 70 can receive mounting fasteners from the bracket. The back plate mounting component 54 in FIG. 25 is a bottom ear 74 having one hole 76, so that the one hole 76 in the bottom ear 74 can receive a mounting fastener from the bracket.

Figure 26:
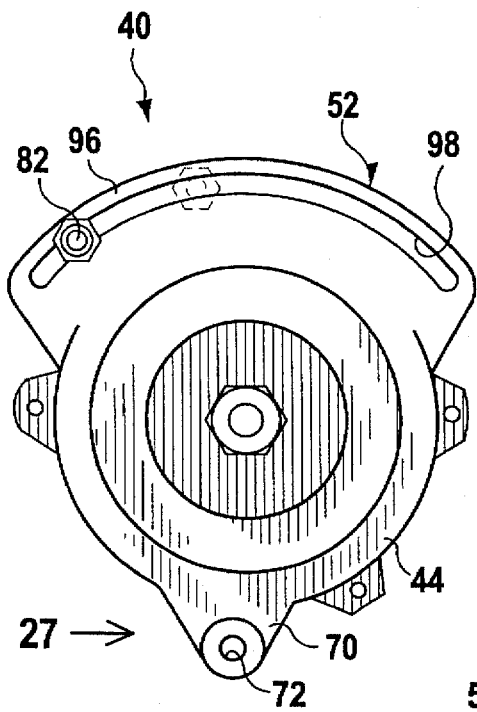
FIG. 26 is a front view of a ninth embodiment of the instant invention.
Figure 27:
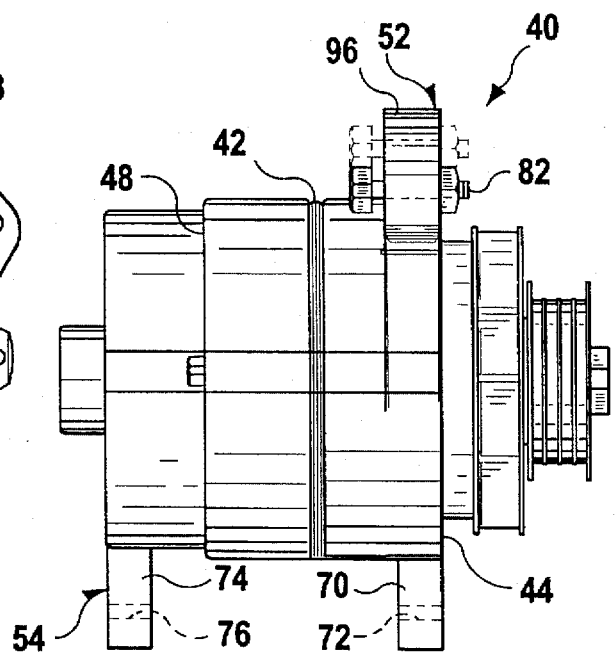
FIG. 27 is a side view of the ninth embodiment taken in the direction of arrow 27 in FIG. 26.

The front plate mounting facility 52 in FIGS. 26 and 27, includes a wide top ear 96 having an elongated curved slot 98. A bottom ear 70 has one hole 72. The elongated curved slot 98 in the wide top ear 96 and the one hole 72 in the bottom ear 70 can receive mounting fasteners 82 from the bracket. The back plate mounting component 54 in FIG. 27, is a bottom ear 74 having one hole 76. The one hole 76 in the bottom ear 74 can receive a mounting fastener from the bracket.

Figure 28:
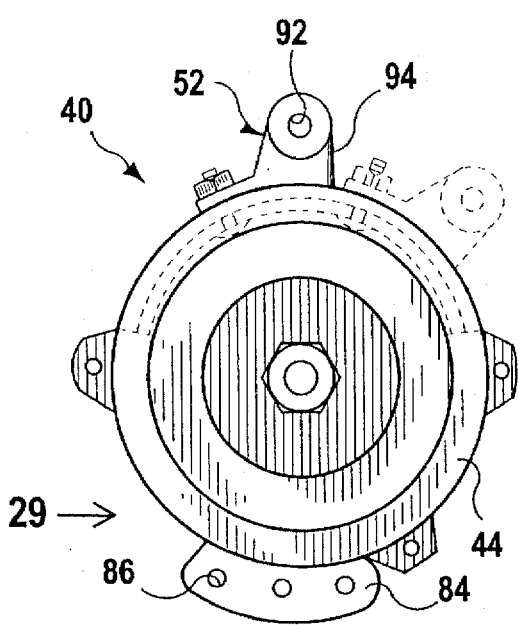
FIG. 28 is a front view of a tenth embodiment of the instant invention.
Figure 29:
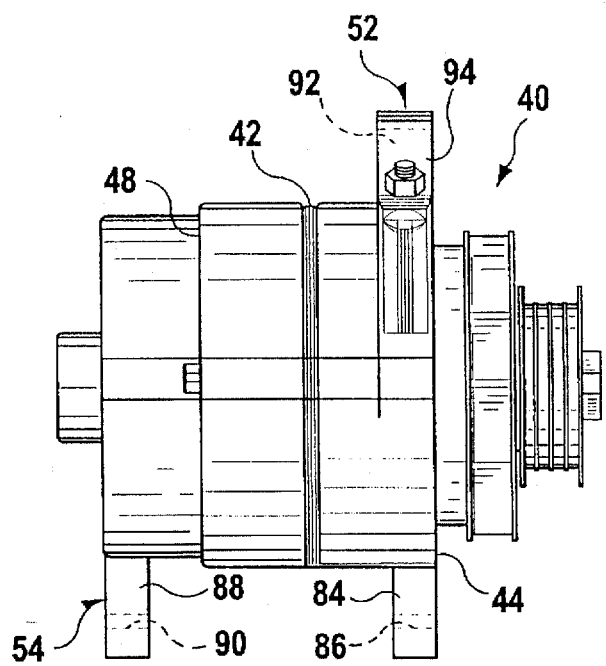
FIG. 29 is a side view of the tenth embodiment taken in the direction of arrow 29 in FIG. 28.
Figure 30:
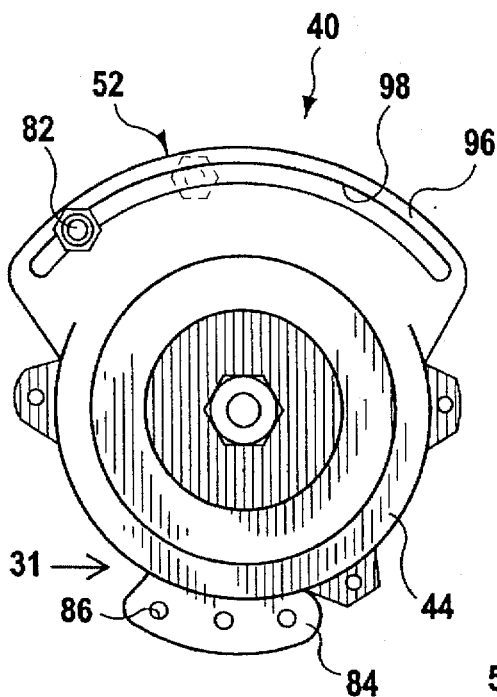
FIG. 30 is a front view of an eleventh embodiment of the instant invention.

The front plate mounting facility 52 in FIGS. 28 and 29, consists of a movable top ear 94 having one hole 92. A bottom ear 84 has three holes 86. The one hole 92 in the movable top ear 94 and one of the holes 86 in the bottom ear 84 can receive mounting fasteners from the bracket.

Figure 31:
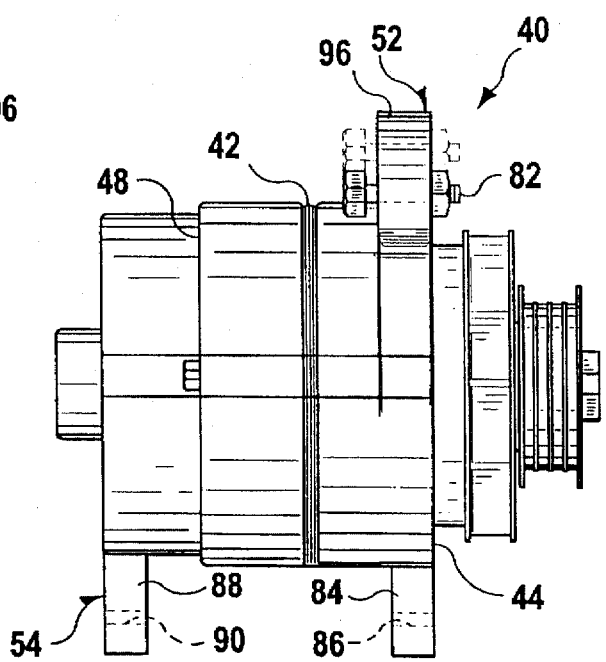
FIG. 31 is a side view of the eleventh embodiment taken in the direction of arrow 31 in FIG. 29.

The back plate mounting component 54 in FIG. 29, is a bottom ear 88 having three holes 90. One of the holes 90 in the bottom ear 88 can receive a mounting fasteners from the bracket. The front plate mounting facility 52 in FIGS. 30 and 31 includes a wide top ear 96, having an elongated curved slot 98. A bottom ear 84 has three holes 86. the elongated curved slot 98 in the wide top ear 96 and one of the holes 86 in the bottom ear 84 can receive mounting fasteners 82 from the bracket. The back plate mounting component 54 in FIG. 31, is a bottom ear 88 having three holes 90. One of the holes 90 in the bottom ear 88 can receive a mounting fastener from the bracket.

LIST OF REFERENCE NUMBERS 32 typical alternator for 34
34 Ford 460 CI engine
36 typical alternator for 38
38 General Motors cross engine
40 universal automotive alternator
42 alternator body of 40
44 front plate of 40
46 front plate attaching assemblage of 40
48 back plate of 40
50 back plate securing structure of 40
52 front plate mounting facility of 40
54 back plate mounting component of 40
56 through lug on 42
58 through lug on 44
60 through lug on 48
61 through bolt
62 top ear of 52
64 hole in 62
66 bottom long ear of 52
67 bottom long ear of 48
68 hole in 66
69 hole in 67
70 bottom ear of 52
72 hole in 70
74 bottom ear of 54
76 hole in 74
78 adjustable top ear of 54
80 hole in 78
82 mounting fastener
84 bottom ear of 54
86 hole in 84
88 bottom ear of 54
90 hole in 88
92 movable top ear of 52
94 hole in 92
96 wide top ear of 52
98 elongated curved slot in 96

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A universally mountable automotive alternator which comprises:

a) an alternator body;

b) a front plate;

c) means for attaching said front plate to said alternator body comprising a plurality of through lugs on said alternator body and a plurality of through lugs on said front plate which are aligned with said alternator body through lugs to permit a plurality of bolts through said front plate and alternator body through lugs to engage with and retain said alternator body;

d) a back plate;

e) means for securing said back plate to said alternator body is comprising a plurality of through lugs on said back plate which are aligned with said alternator body through lugs so that said through bolts can also engage with and retain said back plate on said alternator;

f) means capable of mounting said front plate to a bracket on an engine comprising an adjustable top ear on said front plate having one hole and a bottom ear on said front plate having three holes permitting said one hole in said adjustable top ear and one of said holes in said bottom ear to receive mounting fasteners from the bracket and g) means capable of mounting said back plate to a bracket on the engine including a bottom ear on said back plate having three holes so that one of said holes in said bottom ear can receive a mounting fastener from the bracket.

* * * * *